No. 868,151. PATENTED OCT. 15, 1907.
J. W. ARNOLD.
FLOOR PLANE.
APPLICATION FILED MAR. 1, 1907.

Witness
J. M. Streeter
J. H. Boyden

Inventor
John W. Arnold
By H. L. Davis
his Attorney

UNITED STATES PATENT OFFICE.

JOHN WALTER ARNOLD, OF ATLANTA, GEORGIA.

FLOOR-PLANE.

No. 868,151.  Specification of Letters Patent.  Patented Oct. 15, 1907.

Application filed March 1, 1907. Serial No. 359,966.

*To all whom it may concern:*

Be it known that I, JOHN WALTER ARNOLD, a citizen of the United States, residing at Atlanta, in the county of Fulton and State of Georgia, have invented certain new and useful Improvements in Floor-Planes, of which the following is a specification.

This invention pertains to floor scrapers, more particularly of the roller carriage type, and has as its object to provide a device of that character whereby the same may be easily and noiselessly moved about a floor and remove therefrom any roughness or unevenness and leave the same in one smooth even plane.

Another object is that of providing the scraper with a means for automatically tilting the same on every backward movement thereof and thereby to raise the scraper blade from scratching the planed surface of the floor. Its further object provides for means whereby the scraper may be regulated to scrape heavily or lightly without requiring any physical exertion on the part of the operator.

With these and other objects of importance in view the invention consists in the construction and combination of parts hereinafter more fully described and pointed out in the claims.

Figure 1:
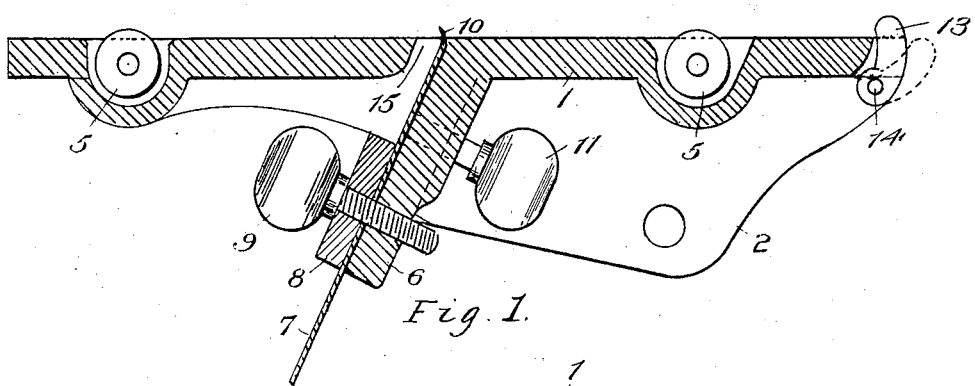
Figure 2:
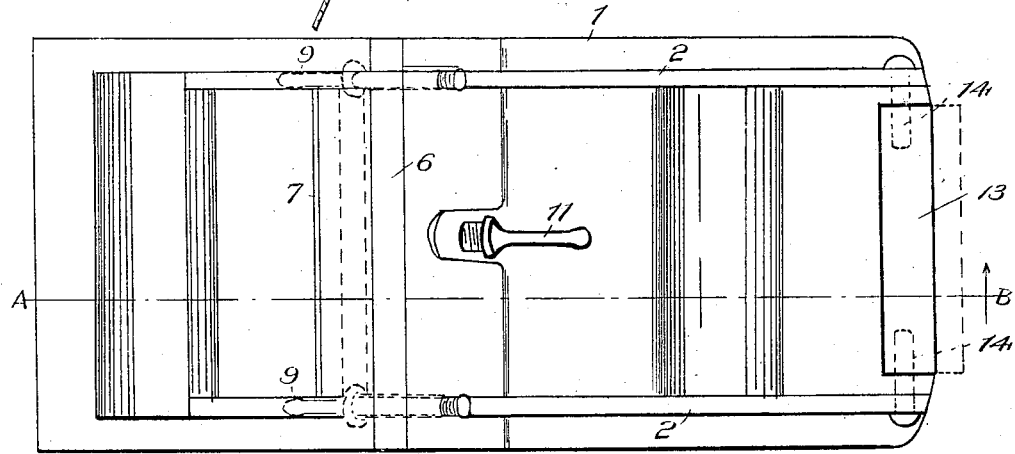
Figure 3:
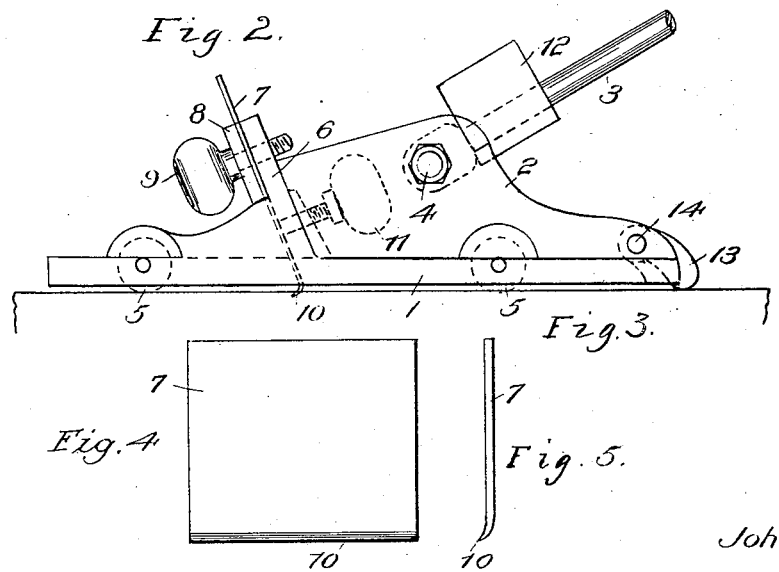
Figure 4:
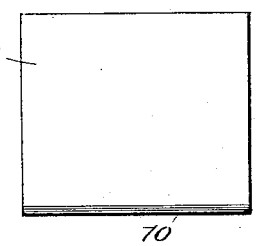
Figure 5:
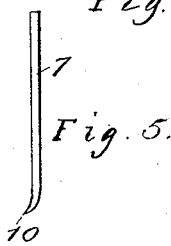

In the accompanying drawings, forming a part of this specification: Figure 1 is a longitudinal section. Fig. 2 is a top plan view thereof. Fig. 3 is a side elevation reduced, and Figs. 4 and 5 show the blade in detail.

Similar reference numerals designate corresponding parts in the different figures.

The device comprises a truck of any suitable design mounted upon rollers 5 and having a base plate 1, and its vertical side walls 2 adapted to receive an operating handle 3 which is journaled thereon by a bolt 4. Said base plate 1 is bifurcated at its rear end as seen in Fig. 2, said bifurcations being adapted to receive therebetween the cam foot 13.

Numeral 6 designates an upright which with the clamping plate 8 and thumb screws 9 constitute the supporting means for the scraper blade 7 which is forwardly inclined as against the usual types which are inclined rearwardly or towards the operating handle. The scraper-blade 7 thus inclined sets its active edge 10 to a drag or relieved position by which all possibilities of its jamming against knots or tearing splinters is obviated. This position rather tends to permit of its readily passing over such obstructions and yet remove therefrom any roughness. The edge 10 of the blade is turned slightly forward, or in the direction of the movement of the scraper, and by means of the regulating screw 11 it may be set to cut at various depths. The opening 15 in the base of the scraper being sufficiently wide to permit this.

To vary the amount of pressure necessary to exert upon the planer as is required on floors of different grains and in the different stages of cleaning a floor, the truck 1, is weighted by one or more weights 12 which are threaded upon the handle.

In cleaning a floor it is desirable that the scraper-blade should pass over the same only in the necessary operative movements, as any more than that has a dulling and scratching effect on the finish. To remedy this defect my device is provided with a lifting foot or cam 13 suitably journaled to the rear end of the planer as at 14. Said foot may be operated by gravity, or a spring may be provided to facilitate its movement. In the forward movement of the scraper the cam 13 will remain inactive, that is,—following behind the planer; but upon the reverse movement of the planer the cam immediately engages against the floor and turning upon its bearings 14, raises the rear end of the truck which elevates the edge 10 of the blade 7 sufficiently to permit of its clearing the floor. This operation likewise saves undue wearing on the edge 10 of the blade.

What is claimed as new is:—

1. A floor scraper comprising a truck having a base-plate bifurcated at its rear end, a cam foot pivoted at said end between the bifurcations, a forwardly inclined scraper-blade support located intermediate the ends of the base-plate, a scraper-blade and means for adjustably connecting the same to said support, a roller journaled in rear of the blade, and forward of the cam-foot, another roller journaled in front of the blade, and an operating handle connected to the truck.

2. In a floor scraper the combination of a carriage, an operating handle journaled thereto, removable weights threaded upon said handle, an integral and forwardly inclined upright having a scraper blade secured thereto, the cutting edge of said blade being turned outwardly, means for vertically adjusting said blade, and separate means for adjusting the cutting depth of said outwardly turned edge, and a cam foot journaled to the rear end of the carriage and projecting beyond said carriage, said cam foot adapted to tilt the carriage during its inoperative movement.

In testimony whereof I affix my signature in presence of two witnesses.

JOHN W. ARNOLD.

Witnesses:
 W. J. NALLEY,
 I. L. HAMMOND.